(12) United States Patent
Vrcelj et al.

(10) Patent No.: US 9,501,725 B2
(45) Date of Patent: Nov. 22, 2016

(54) INTERACTIVE AND AUTOMATIC 3-D OBJECT SCANNING METHOD FOR THE PURPOSE OF DATABASE CREATION

(71) Applicant: QUALCOMM Incorporated, San Diego, CA (US)

(72) Inventors: Bojan Vrcelj, San Diego, CA (US); Daniel Knoblauch, San Diego, CA (US); Raghuraman Krishnamoorthi, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 14/302,056

(22) Filed: Jun. 11, 2014

(65) Prior Publication Data

US 2014/0363048 A1    Dec. 11, 2014

Related U.S. Application Data

(60) Provisional application No. 61/833,889, filed on Jun. 11, 2013.

(51) Int. Cl.
*G06T 7/00* (2006.01)
*G06K 9/78* (2006.01)
*G06K 9/62* (2006.01)

(52) U.S. Cl.
CPC ............... *G06K 9/78* (2013.01); *G06K 9/6228* (2013.01); *G06T 7/0046* (2013.01); *G06T 2207/10028* (2013.01); *G06T 2207/20081* (2013.01)

(58) Field of Classification Search
CPC ...................................................... G06K 9/00

USPC .......................................................... 382/103
See application file for complete search history.

(56) References Cited

U.S. PATENT DOCUMENTS

| 2007/0216675 A1* | 9/2007 | Sun .................... G06T 11/00 345/419 |
| 2009/0010507 A1* | 1/2009 | Geng ................. G06T 7/0075 382/128 |
| 2010/0232727 A1* | 9/2010 | Engedal ............. G06T 7/0046 382/285 |

(Continued)

FOREIGN PATENT DOCUMENTS

WO    WO-2006084385 A1    8/2006

OTHER PUBLICATIONS

Dong, Zilong, Zhang, Guofeng, Jla, Jiaya, Bao, Hujun, Bao. "Keyframe-Based Real-Time Camera Tracking" IEEE 12th Conference on Computer Vision. 2009.*

(Continued)

*Primary Examiner* — Kim Vu
*Assistant Examiner* — Molly Delaney
(74) *Attorney, Agent, or Firm* — Kilpatrick Townsend & Stockton LLP

(57) ABSTRACT

Systems, methods, and devices are described for capturing compact representations of three-dimensional objects suitable for offline object detection, and storing the compact representations as object representation in a database. One embodiment may include capturing frames of a scene, identifying points of interest from different key frames of the scene, using the points of interest to create associated three-dimensional key points, and storing key points associated with the object as an object representation in an object detection database.

20 Claims, 11 Drawing Sheets

(56) References Cited

U.S. PATENT DOCUMENTS

| | | |
|---|---|---|
| 2010/0310177 A1 | 12/2010 | Xiong et al. |
| 2011/0299770 A1 | 12/2011 | Vaddadi et al. |
| 2012/0194513 A1* | 8/2012 | Sakurai .................. G06T 15/04 345/419 |
| 2012/0300979 A1 | 11/2012 | Pirchheim et al. |
| 2013/0148851 A1 | 6/2013 | Leung et al. |

OTHER PUBLICATIONS

Pircchiem, Christian, Reitmayr, Gerhard. "Homography-Based Planar Mapping and Tracking for Mobile Phones". IEEE International Symposium on Mixed and Augmented Reality 2011.*
International Search Report and Written Opinion—PCT/US2014/042005—ISA/EPO—Sep. 25, 2014.

* cited by examiner

INTERACTIVE AND AUTOMATIC 3-D OBJECT SCANNING METHOD FOR THE PURPOSE OF DATABASE CREATION

CROSS-REFERENCE TO RELATED APPLICATION

This application claims the benefit of U.S. Provisional Application No. 61/833,889, filed Jun. 11, 2013, entitled "INTERACTIVE AND AUTOMATIC 3-D OBJECT SCANNING METHOD FOR THE PURPOSE OF DATABASE CREATION", which is hereby incorporated by reference, as if set forth in full in this document, for all purposes.

FIELD

The present disclosure relates generally to image recognition, and in particular, to the creation of object representation base information which may be used to assist in identifying objects.

BACKGROUND

Devices such digital cameras, phones with embedded cameras, or other camera or sensor devices may be used to identify and track objects in three-dimensional environments. This may be used to create augmented reality displays where information on objects recognized by a system may be presented to a user that is observing a display of the system. Such information may be presented on an overlay of the real environment in a device's display. Information from a database of objects may then be used to identify objects in the environment observed by a device.

Mobile devices in particular with embedded digital cameras may have limited storage and processing, particularly in comparison to powerful fixed installation server systems. One way of reducing the processing and bandwidth load of a system implementing such object detection/tracking is to store a local database of object information that may be used to identify objects in the environment. This database information may essentially be considered assistance information to help a device identify objects using templates that are stored in a database. When a device is operating in an augmented reality or object identification mode, images captured by the device are compared with object representations in a database to determine if there is an object match, and if so, what the current pose of the camera is compared to the identified object. When an object match occurs, a responsive action may be initiated or additional information related to the object may be presented in a device display in conjunction with the image containing the identified object.

While systems exist for creating such database information, the existing systems are not scalable to a broad variety of mobile devices. One embodiment of such an existing system uses combined geometric/texture models of the object of interest. These models are sometimes known at the object production stage (CAD models), but in most cases they are unavailable. Another known method is to use a laser-based or IR-based scanning system to simultaneously estimate the geometry and collect images of an object. However, such scanning systems are typically expensive, and yet are texture challenged due to physical limitations of different sensors used. Thus, in general, the models are either unavailable or somewhat inaccurate to the point where they affect detection performance.

Systems and methods for creating three-dimensional object representations for use in computer vision as described herein may provide improvements and simplification in the way object representations are currently obtained for use in detection and tracking systems.

BRIEF SUMMARY

Systems and methods for creating three-dimensional object representations are described herein. One embodiment may be a method of capturing compact representations of three-dimensional objects suitable for offline object detection comprising: capturing, using a camera module of a device, a plurality of images of a scene, wherein each of the plurality of images of the scene includes an image of at least a portion of an object; identifying a first image of the plurality of images as a first key frame and a first position of the device associated with the first image, wherein the first image is captured by the device from the first position; identifying a second image of the plurality of images as a second key frame and a second position of the device associated with the second image, wherein the second image is captured by the device from the second position, and wherein the second position is different from the first position; identifying a first plurality of points of interest from the first key frame, wherein the first plurality of points of interest identify features from the scene; identifying a second plurality of points of interest from the second key frame, wherein the second plurality of points of interest identify at least a portion of the features from the scene; matching the first plurality of points of interest and the second plurality of points of interest; identifying key points associated with the object based at least in part on the matching of the first plurality of points of interest and the second plurality of points of interest; and storing the key points associated with the object as an object representation in an object detection database.

Additional embodiments may further operate where identifying key points associated with the object comprises: filtering the first plurality of points of interest and the second plurality of points of interest to identify points of interest associated with the object.

Additional embodiments may further operate where filtering the first plurality of points of interest and the second plurality of points of interest comprises one or more of: deleting points of interest with a mean distance to a threshold number of the nearest points of interest that is less than a threshold distance; deleting the points of interest that are not matched with points of interest from other key frames; and deleting the key points outside of a defined volume of the scene.

Additional embodiments may further operate where the scene further comprises a planar target or where matching the first plurality of points of interest and the second plurality of points of interest comprises: identifying the first position of the device from a first location of the planar target in the first image; identifying the second position of the device from a second location of the planar target in the second image; determining a relative position between the first position of the device and the second position of the device; matching the first plurality of points of interest and the second plurality of points of interest based on the relative position between the first position and the second position; and determining and recording a position of each key point in a coordinate system.

Additional embodiments may further operate where each key point comprises key point location information and a key point descriptor, comprising information derived from the appearance of the pixel area around the key point of interest. In certain embodiments, the key point descriptor may comprise a gradient or other information associated with a key point and pixels surrounding the key point.

Additional embodiments may further operate where identifying the first image as the first key frame comprises a user selection.

Additional embodiments may further operate where identifying the first image as the first key frame comprises an automatic selection by the device.

Additional embodiments may further operate where identifying the second image as the second key frame comprises: identifying a key point density within the second image; identifying a spatial relationship between the second position and the first position; determining that a key frame at the second position would provide data with a data value above a threshold value for use in the object representation; and selecting the second image as the second key frame.

An alternative embodiment may be a system for capturing compact representations of three-dimensional objects suitable for offline object detection comprising: a camera module of a device that captures a plurality of images of a scene, wherein each of the plurality of images of the scene includes an image of at least a portion of an object; one or more processors that (1) identifies a first image of the plurality of images as a first key frame and a first position of the device associated with the first image, wherein the first image is captured by the device from the first position; (2) identifies a second image of the plurality of images as a second key frame and a second position of the device associated with the second image, wherein the second image is captured by the device from the second position, and wherein the second position is different from the first position; (3) identifies a first plurality of points of interest from the first key frame, wherein the first plurality of points of interest identify features from the scene; (4) identifies a second plurality of points of interest from the second key frame, wherein the second plurality of points of interest identify at least a portion of the features from the scene; (5) matches the first plurality of points of interest and the second plurality of points of interest; and (6) identifies key points associated with the object based at least in part on the matching of the first plurality of points of interest and the second plurality of points of interest; and a memory that stores the key points associated with the object as an object representation in an object detection database.

Such an embodiment may further function where the device further comprises: a display coupled to the camera module, wherein the display outputs an image of at least a portion of the key points as the camera module of the device that captures at least a portion of the plurality of images of the scene.

Such an embodiment may further function where the display further outputs a video image of the scene with the key points overlaid on the object, where the device further comprises a motion sensor, wherein the second position of the device is identified by the one or more processors using information from the motion sensor, or where the device further comprises: a user input module, wherein identifying the first image as the first key frame comprises a user selection received at the user input module of the device.

Such an embodiment may further function where the device further comprises: an antenna; and a wireless transceiver; wherein the one or more processors are coupled to the device via a network, the antenna, and the wireless transceiver.

Another embodiment may be a non-transitory computer-readable medium comprising instructions that, when executed by a processor coupled to the non-transitory computer-readable medium cause a device to: capture, using a camera module of the device, a plurality of images of a scene, wherein each of the plurality of images of the scene includes an image of at least a portion of an object; identify a first image of the plurality of images as a first key frame and a first position of the device associated with the first image, wherein the first image is captured by the device from the first position; identify a second image of the plurality of images as a second key frame and a second position of the device associated with the second image, wherein the second image is captured by the device from the second position, and wherein the second position is different from the first position; identify a first plurality of points of interest from the first key frame, wherein the first plurality of points of interest identify features from the scene; identify a second plurality of points of interest from the second key frame, wherein the second plurality of points of interest identify at least a portion of the features from the scene; match the first plurality of points of interest and the second plurality of points of interest; identify key points associated with the object based at least in part on the match of the first plurality of points of interest and the second plurality of points of interest; and store the key points associated with the object as an object representation in an object detection database.

Examples of such an embodiment may further operate where the instructions, when executed by the processor, further cause the device to: filter the first plurality of points of interest and the second plurality of points of interest to identify points of interest associated with the object as part of identifying key points associated with the object.

Examples of such an embodiment may further operate where the instructions, when executed by the processor, further cause the device to: delete points of interest with a mean distance to a threshold number of other points of interest that is less than a threshold distance and deleting the points of interest that are not matched with points of interest from other key frames as part of the filtering the first plurality of points of interest and the second plurality of points of interest to identify points of interest associated with the object.

Examples of such an embodiment may further operate where the instructions, when executed by the processor, further cause the device to: delete the key points outside of a defined volume of the object as part of the filtering the first plurality of points of interest and the second plurality of points of interest to identify points of interest associated with the object.

Examples of such an embodiment may further operate where each key point of the key points associated with the object as the object representation in the object detection database comprises coordinate information, brightness information, and surrounding pixel pattern information.

DETAILED DESCRIPTION

Figure 1:
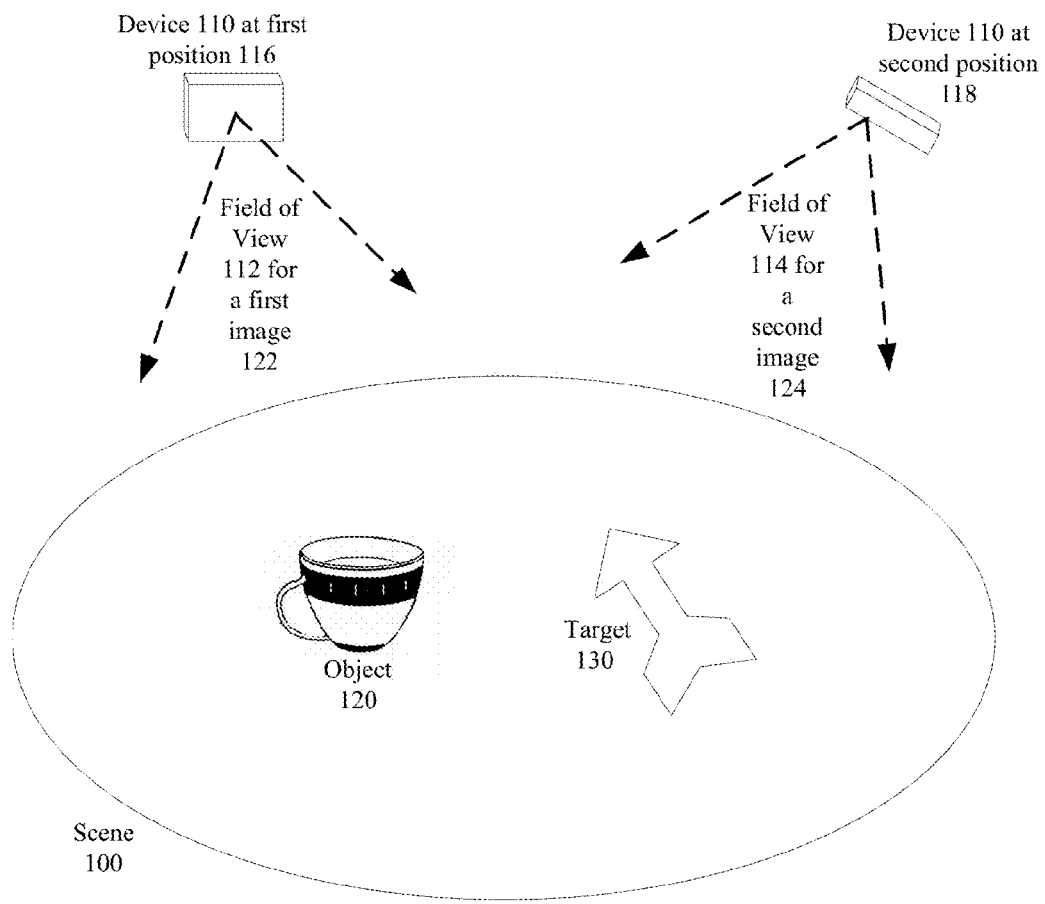
FIG. 1 illustrates aspects of one embodiment including an object to be scanned into a database.

Embodiments described herein relate to systems and methods for scanning objects to create object representation, where the object representation is created to optimize object recognition by a device.

Embodiments described herein may create compact object representation which may be stored in a database and used later to match objects seen in an image captured at a device with previously scanned objects. This may be distinguished from other embodiments where a compact representation of an object is created and used to track the object, but is not stored for future object identification. For the embodiments described herein, compact representations may compress a large number of video or picture images into a relatively small number of key points with associated descriptive data. In one example, several megabytes of video data may be processed to achieve a compact object model with 1000 key points and descriptive information about those key points, such as gradient information of surrounding area viewed from different angles. An extractor of saliency key points may process such video data by first filtering out images from all the images in the video data by selecting a subset of images as key frames. The key frames may then be processed by selecting points of interest of high contrast or high curvature within the key frames. The points of interest may then further be ordered by repetition across key frames, their proximity to other points of interest, or other image-level or geometric point of interest values. Such processing, which takes sequence of images on one end and produces a compact object consisting of saliency key points and their description, is done in a manner not known in the prior art. Certain embodiments may use aspects of SLAM (Simultaneous Location and Mapping) or PTAM (Parallel Tracking and Mapping) systems as means for separating images into key frames and establishing geometric relationship between the points of interest observed across images and key frames, and then may additionally provide point of interest segmentation and pruning so as to arrive at compact objects from sets of key points in a manner not known in the prior art. Such systems thus provide efficient creation of object representations suitable for creating databases of compact object information for arbitrary objects in a manner not previously known. Such object representations may be stored on a device that is not connected to a network, and may be used to recognize objects in images captured by the device.

For example, an object to be scanned may be placed on a table next to a known scene. The known scene may be given by a known planar object (planar target), a known three-dimensional object (3-D target) or a combination of the two. The target's position and orientation are known to a mobile device that is to scan the object. This is achieved by object detection and tracking of previously known object-target. The mobile device may be, for example, a phone with a camera, a processor, and available memory storage space. Alternatively, a mobile device may be a camera acquiring a video sequence that may be post-processed on a separate processing unit offline. A mobile device may also be a camera connected to a personal computer or an alternative processing device. A user may enter a command to begin a scanning process, at which point the mobile scanning camera may begin capturing images of a scene including the object. The device may analyze the images in real time, in a time period delayed by up to several seconds, or may simply store the images for later analysis. As a user moves the device to different positions around and above the object, images from different distances, angles, and elevations will be captured such that different views of the object are stored. In some embodiments, for example for a device implementing real time or near real time analysis, the device may provide directions or recommendations for movement of the device to capture images from preferred positions. The compact representation may then be accessed later to identify the object in an image or a video stream.

In another embodiment, a scanning device with camera may be mounted and fixed, while the object of interest may be rotated and moved in a fashion so as to reveal as much of its surface from various viewing angles as possible. This scanning device may be a phone, a video recorder, a digital camera, or any other such device that may include a camera and other modules according to the particular implementation. The object may again be accompanied by a known target in order to facilitate associating points of interest extracted to a known coordinate system. Alternatively, in a different embodiment, the entire system from camera holder to podium for object scanning may be perfectly calibrated so that the camera position with respect to the object is known at any moment.

Certain images may then be selected as key image frames. Such key frames may simply be taken periodically, may be selected after analysis by a processor, or may be selected manually by a user. Once a plurality of key frames has been selected, points of interest within the key frames are identified, and an analysis may be done to identify a relative location of the camera at the time each key frame was captured. The device position analysis may use image data for the known target, data from a position module integrated as part of or coupled to the camera. The position module may be any suitable module such as an accelerometer or gyroscope, data from a calibrated image acquisition system (like a robotic arm with object holder and rotating table) or any combination of such means for tracking movement and position of the camera with respect to a fixed coordinate system as images are captured. The position of the camera during the capture of each key frame may then be used to match two dimensional points of interest from different key frames to create three dimensional (3-D) key points.

During certain steps, key points or points of interest from the key frames may be filtered to remove key points or points of interest unlikely to be associated with the object being scanned. This leaves a compact set of key points that describe the object. These remaining key points describing the object may be stored as object representation in a database. Later, when an augmented reality or object identification application is executed by an object identification device, the images captured by a camera of the object identification device may be analyzed using the compact key point object representation in the database to identify particular objects present in camera view and their poses with respect to the camera of the object identification device. This object identification device may be the same scanning device that initially created the object representation, or may be a different device.

Finally, the key points which are filtered and selected are aggregated as part of an object representation. The object representation is a collection of key points in a particular coordinate system which are associated for later use in identifying the object or other objects with a similar shape and size. The object representation may include not only coordinate locations for key points, but color information, or any other such information that may be useful for object identification. A database of multiple object representations, each of which contains key points for a previously scanned object, may then be accessed while a user is interacting with a scene in the detection mode in order to identify the object or similar objects using the object representations as stored in the database.

FIG. 1 illustrates an aspect of one embodiment. FIG. 1 includes device 110, object 120, target 130, and scene 100. Device 110 is shown in a first position 116 and in a second position 118. Scene 100 may be a specifically defined area or volume which device 110 has identified as a boundary for key points. Alternatively, scene 100 may simply be the limits of the area for which images are captured as device 110 moves to different positions capturing images as part of the scanning process for creating a compact representation of object 120 to store in a database.

Device 110 may be any device capable of capturing an image with a coupled processor and storage for compact object representation. As described above, in one embodiment, device 110 may be a phone with an embedded camera. Device 110 may alternatively be a dedicated augmented reality device, a head mounted device with a camera module, a camera with a port for transferring data to a separate computing module, or any such device capable of capturing images of an object and identifying key data. Any of the above examples of device 110 may create image data, key frame data, key point data, compact object representation, or any combination thereof, which may be stored at a local or a remote database. In certain embodiments this data may then be transferred to another device for use in tracking objects, detecting objects, or both. In alternative embodiments, the local object representation may be used on the local device just after creation of the local object representation for tracking of the object.

Device 110 includes at least one sensor for capturing image data. Examples of such sensors include monocular cameras, stereo cameras, and RGBD sensors. As shown in FIG. 1, as part of a scanning process, device 110 will capture at least two images, from different positions, which may be used as key frames. FIG. 1 shows field of view 112 for a first image 122 which is captured when the device 110 is at the first position 116. Also shown is field of view 114 for a second image 124 which is captured when the device 110 is at the second position 118. In order to function as a key frame, each image must include at least a portion of object 120. A remaining portion of object 120 may be occluded by another object, or may be outside the field of view for the particular position of the camera.

As used herein, the position of a device refers to the spatial location and orientation of the device including the spatial location and orientation of any sensors on the device and the relationship between the sensors on the device and the device. Position may also be referred to as pose, especially as directed to a handheld device being moved through various positions and orientations by a user. The position information thus captures the location and field of view information for a camera of a device with respect of a coordinate system in which the object is seen as static.

Object 120 may be any object with object point of interest features able to be captured by a camera of device 110. In certain embodiments, object 120 may be sufficiently large that only a portion of the object may be captured by a user close to object 120. Alternatively, object 120 may be of any small size as long as the camera of device 110 has sufficient resolution and sensitivity to capture point of interest information for the object. An acceptable object may then be considered to be an object that has points of interest that may be identified from images. In processing of key frames, these points of interest may be identified as two dimensional aspects of 3-D key points. Key points may be identifying points which enable the efficient identification of an object. Points near areas of high contrast and high curvature may be one example of key points.

As used herein, "key point" refers to a point in a three-dimensional coordinate system that, in conjunction with other key points, may be used to identify an object. Single key frames may contain a two-dimensional projection of a plurality of points of interest that are associated with these key points. These two-dimensional aspects are referred to herein as "points of interest." As these points of interest are identified in multiple key frames from different camera poses or different device positions, the three-dimensional position of each key point may be derived from the two-dimensional point of interest information and the device position information. Thus, a key frame will include two-dimensional information about a key point. The two-dimensional location of a point of interest within a key frame, in conjunction with associated points of interest from other key frames, enables identification of a point on the object in three dimensions as a 3-D key point. The two-dimensional appearance of a point on the object associated with a key point as a point of interest and its surroundings within a key frame may then be used to form a descriptor of this key point associated with the key frame. Because of uncertainties such as device position uncertainty, image blur, and other such sources of errors, key points may have multiple possible positions in a 3-D coordinate system. Statistical averages or processing of points of interest from multiple key frames may be used to identify the 3-D key point location from the two-dimensional information of multiple key frames in conjunction with the position information of the device when each frame was captured. Examples of points of interest and key points may be seen in FIGS. 3A-3E, and will be described in more detail below.

Target 130 is shown as an arrow, but may be any patterned or unpatterned shape which may be used to determine the orientation of device 110 based on image data. Orientation of the camera may be given by three angles of the camera optical axis with respect to a coordinate system, such as the world coordinate system or the target-centered coordinates. Device 110's position provides another three values: x, y, z of the camera lens in the world coordinate system. Together, they form the camera six degrees of freedom. In certain embodiments, target 130 may be, for example, a piece of paper with edges and distinguishable from the surrounding portion of scene 100. In certain embodiments, target 130 may be a known patterned surface on which the object 120 is placed. In alternative embodiments, a volume target may be used, a planar target may be used, or no target may be used.

In certain embodiments, target 130 may enable matching of points of interest from different images that is more efficient for object representation creation, as described in detail below. This matching may be more efficient for database creation than typical SLAM key point matching. Typical SLAM systems establish correspondences between key frames by calculating small transformations between consecutive images, and following the transformations across multiple images between key frames. This process is processor-intensive, latency-sensitive, and suited to a real time analysis of an environment where this information may have other uses. In an environment where processing power is limited and the goal is creation of compact object representations for a database, this process is inefficient for establishing correspondences between key frames. Further, in certain embodiments, this information may not be available to track the transformations of points of interest across images between key frames. This may be the case in systems which allow a device 110 to stop recording images and jump to a new position before resuming recording, or in embodiments in which only key frames are stored but intermediate images are not stored. Matching of points of interest is discussed further with respect to FIG. 4 below.

Various alternative embodiments may function without a target. For example, in certain embodiments, an automated object segmentation algorithm may be used to distinguish objects in various key frames. In alternative embodiments, a user input may identify an object, and the object as identified by the user in one or more frames may then be tracked in other frames based on the user input identifying the volume in 3-D where the object resides. In still further embodiments, any combination of different object identification methods may be used.

Figure 2:
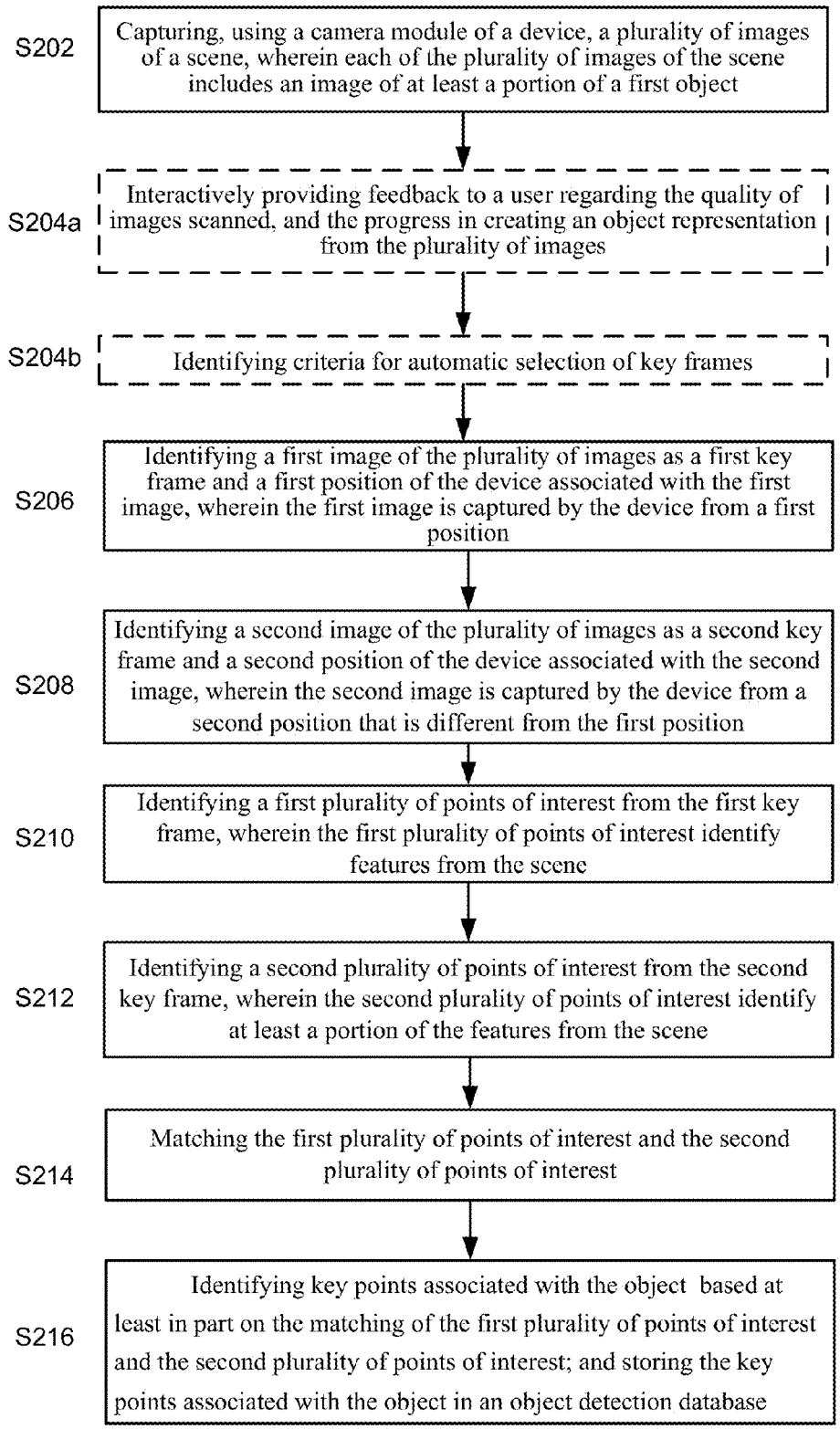
FIG. 2 illustrates aspects of a method of scanning an object to create an object representation for a database according to one embodiment.

FIG. 2 describes one method that may be used in conjunction with various embodiments. In S202, a camera module of a device such as device 110 is used to capture a plurality of images of a scene, where each of the plurality of images includes at least a portion of a first object. In one example, a user may move the device around the object being scanned in order to capture information from as many positions as possible to provide more information for the creation of a compact object representation. In alternate embodiments, a pre-programmed robotic arm may move the camera to enable capture of multiple different images of the scene including the object being scanned.

In S204a, the device may interactively provide feedback to a user regarding the quality of the images scanned and how useful the images are in creating an object representation for a database from the plurality of images. For example, a display of the device may show scene 100 with object 120 and target 130. The display may also include text and image indications related to the number and quality of key points or points of interest identified during scanning of object 120. S204a may be repeated periodically after identification of key frames or key points to update the feedback provided to the user. In one embodiment, extracted key points or points of interest may be visualized directly on the object and/or the rest of the scene depending on whether segmentation is implemented prior to the display step or after the display step. Further, in another alternative embodiment, only extracted key points which have been observed as points of interest in a threshold number of frames may be displayed, with the threshold set as a rough indication of the number of reliable points of interest observed as part of the scanning process for an object being scanned.

In S204b, a system may identify criteria for automatic selection of key frames and/or for automatic selection of points of interest from key frames. Additional details regarding such selection are described in detail herein, but may include criteria such as the angle and location of a nearest selected key frame, an image quality, a density of points of interest on the object to be scanned, a similarity of appearances of the points of interest, or other similar such criteria. As feedback is provided to a user and updated during the scan of an object, automatic key frame selection criteria may be altered by a user. In one embodiment, the key frame selection may be done entirely as per request from an underlying SLAM system, with the automatic selection of key frames part of the structure of the SLAM system. Additional details of scanning implementations that use SLAM for selection of key frames is discussed below. Alternatively, such automatic key frame selection criteria may be disabled in favor of manual selection by a user. In a manual selection system, a user may explicitly select specific frames to be identified as key frames. This selection may occur either on-line, in which case the user selects key frames by live interaction with the scanning system, or off-line, where the user has the ability to override the selection key frames determined by the system.

In still further embodiments, a system may provide automated feedback for when a sufficient diversity of key frames has been achieved to create an adequate object representation. The feedback may be provided by simply displaying the key points on the object which have thus been selected for object representation, and/or by displaying the selected key frame count and location coupled with orientation. By inspecting the density of selected points of interest and/or the key frames, the user may then infer the likely quality of such representation and decide when sufficient information has been captured. In another embodiment, the feedback may be provided in a more explicit manner by interactively displaying a measure of the representation quality. This measure may be based on a real time analysis or on a user-selected setting to verify a sufficient diversity of views of the object. For a real time analysis, the system may check for occluded sides of the object, or partial capture of certain elements of an object. It may also check noise levels of the key frames to ensure that excessive motion or blur has not corrupted the key frame information. In certain embodiments, the capturing system builds the object representation on the fly, and uses such representation to attempt detecting the object in real time. The successful detection instances may be visualized by displaying near the real object an augmentation, the size and position of which depends on the computed camera pose at the time of detection. A user may then determine from the visual feedback when sufficient information has been captured because the user may observe that the augmentation is stable from various views. Note that the quality of object representation may not be uniform from all views, and this can also be efficiently captured by the interactive system as described herein.

In S206, the selection criteria may be used to identify a first image of the plurality of images as a first key frame, and in S208, a second image of the plurality of images captured from a different location may be identified as a second key frame. For both the first key frame and the second key frame, the position of the device when the frame was recorded may be known. Any number of methods may be used to determine the device position. Accelerometers, or any number of various displacement measurement methods may be used to determine a current position of the device for each key frame. In another embodiment, during the key frame capture, the camera may be placed on a gripping device which has been perfectly calibrated with respect to the object coordinate system in a way such that the camera location information at each key frame is automatically known. The camera location information may also be inferred by tracking the Target 130 at any given time, or may be determined by the underlying SLAM system in certain embodiments, or by any device tracking methods or systems such as parallel tracking and mapping (PTAM) systems. Any combination of the mentioned camera localization systems is also possible. This position information will include not only x, y, and z position information, but also angle information about the direction the lens of the camera is facing and the field of view of the camera, or other such information. This position information may also be referred to as the camera pose.

In S210 and S212, points of interest from each key frame are identified. Such points of interest identify point of interest features of each frame, such as areas of high contrast. In S214, the points of interest from each image are matched. Because the points of interest from each image are taken from a different position, this enables three-dimensional information to be associated with each point. The greater number of key frames used, the greater the amount of three-dimensional information created in the matching of points of interest. As part of this identification process, correspondences between two-dimensional points of interest from particular frames are established. This correspondence enables determination of a three-dimensional coordinate for the key point based on the plurality of two-dimensional identifications of points of interest associated with the key points from different key frames. One example of this is the use of epipolar geometry as described in FIG. 4. This process of merging point of interest information from different key frames continues across all points of interest extracted from all key frames. Establishing correspondences in this way sometimes involves modifying three-dimensional key points which have information from multiple key frames with information from an additional key frame. Thus, in certain embodiments, a three-dimensional key point may include information from the two-dimensional point of interest aspects associated with a particular key point identified in as few as two key frames, or in many hundreds or thousands of key frames. When a three-dimensional key point derives information from a large number of points of interest, the information may be filtered or averaged using a variety of different means in order to increase the accuracy of a single key point location for use in the final object representation to be stored in a database for later use.

Once all points of interest from the key frames are associated with a three-dimensional key point location, the system may determine which three-dimensional key points will be kept as part of an object representation. In S216, key points associated with the object are identified. This step may include various components, including object segmentation, filtering outliers based on proximity to the nearest neighbors' key points, filtering by the number of observations, or other such filters. In certain embodiments, this may be done by separating information from a known target or known background in the scene to identify key points associated with the object being scanned. In other embodiments, other information may be used to segment the object representation from the background scene representation. Specific embodiments of such segmentation are described further below. Once the key points associated with the object are segmented from the background scene key points, the key points associated with the object and surrounding details for each key point are stored as an object representation in a database. This object representation may then be used immediately to identify and track the object.

Figure 3A:
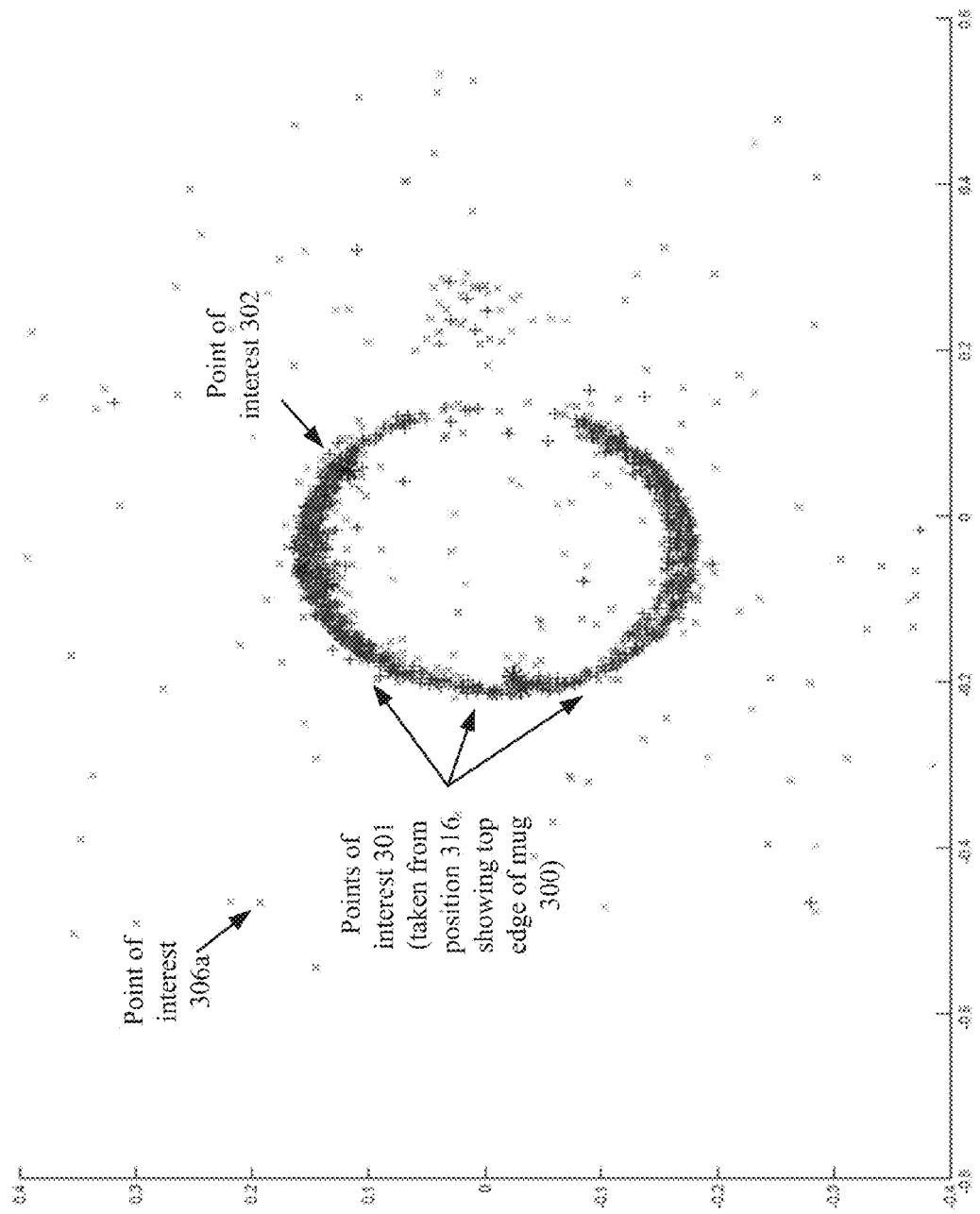
FIG. 3A illustrates aspects of one potential embodiment including unfiltered points of interest from one device position.
Figure 3B:
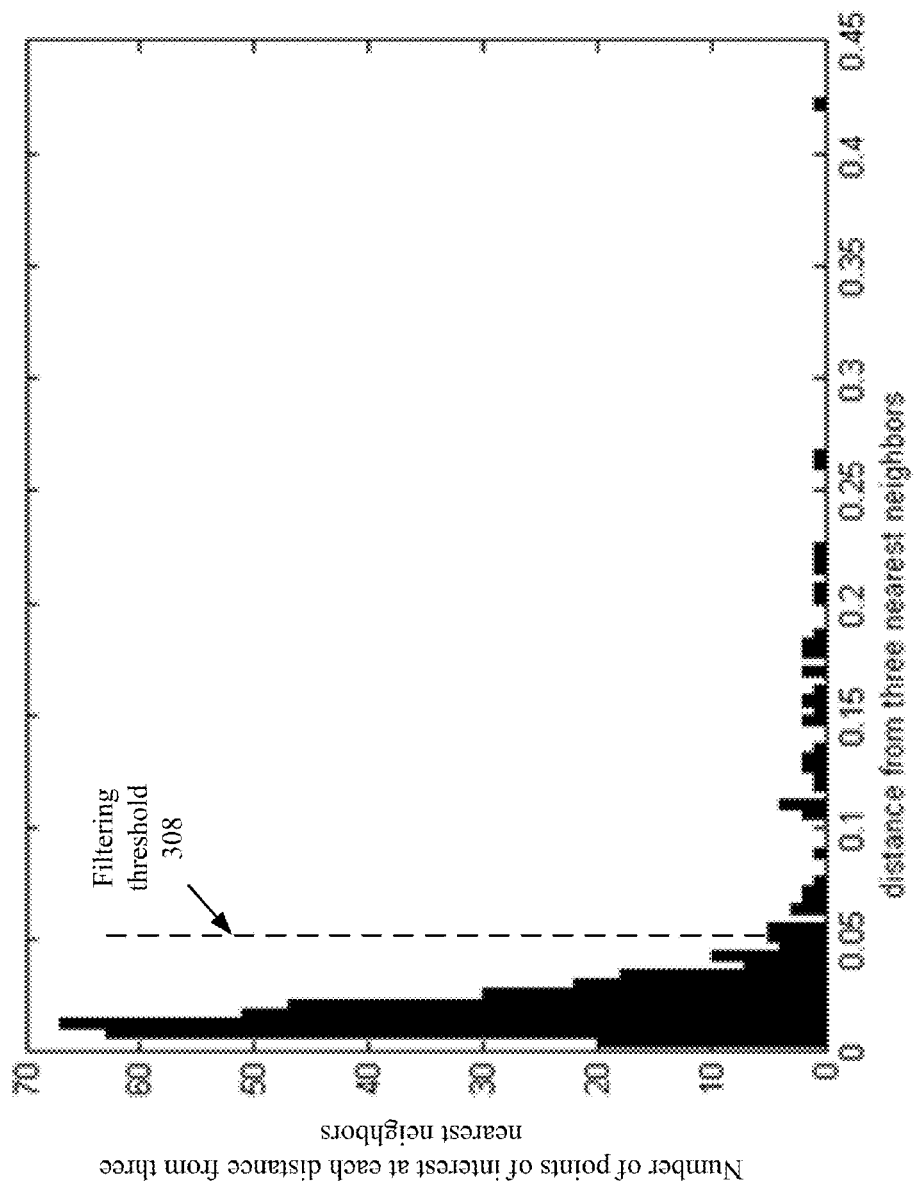
FIG. 3B illustrates aspects of one embodiment including a histogram of points of interest.
Figure 3C:
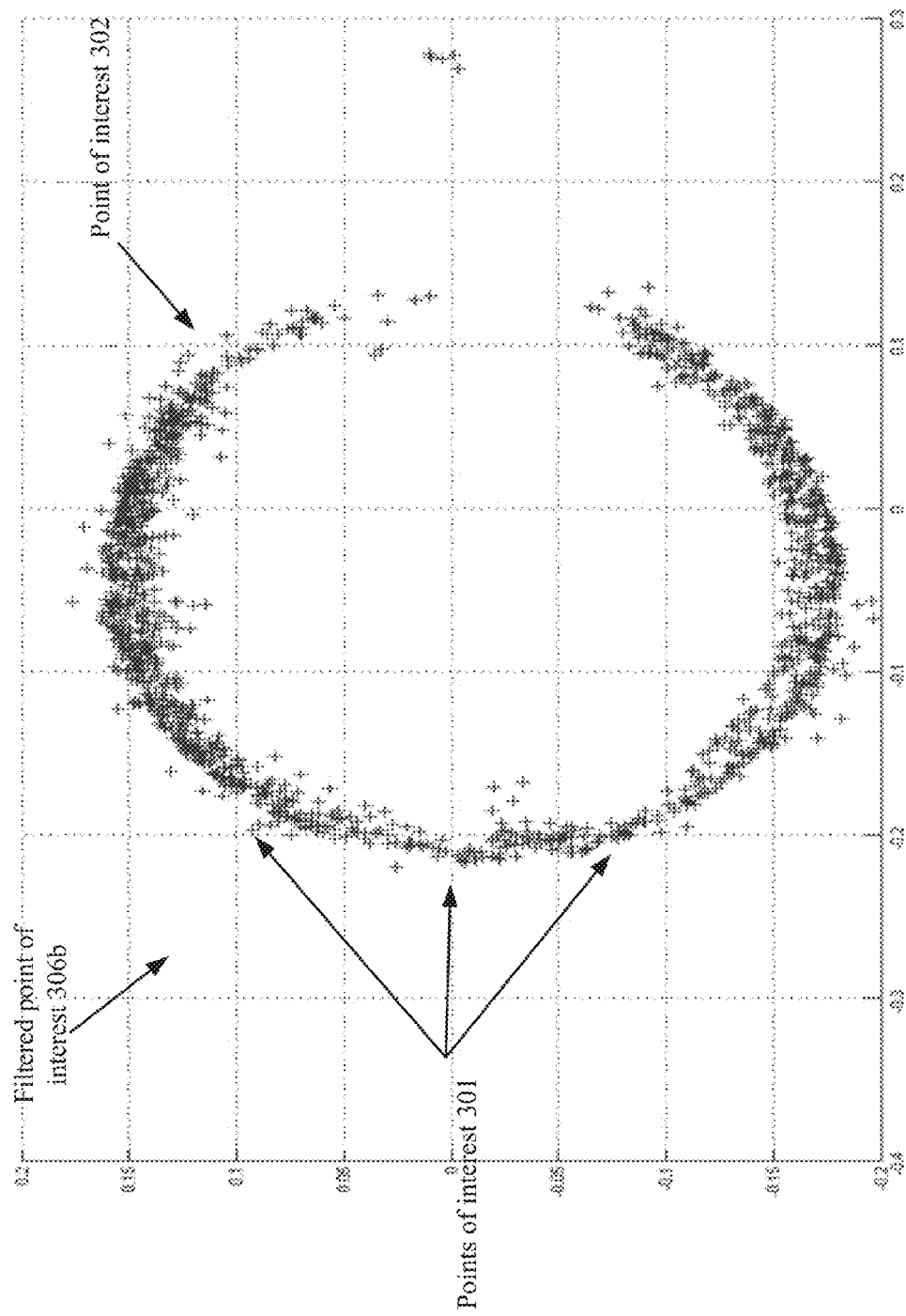
FIG. 3C illustrates aspects of one potential embodiment including filtered points of interest.

FIGS. 3A, 3B, 3C, 3D, and 3E then describe further details of points of interest identified from 2D images that may be used to derive three-dimensional (3-D) key points which make up compact object representations for a database along with additional descriptive information. In FIGS. 3A and 3C, because the points of interest are viewed looking down from the top, the points of interest are points around the sides of the mug. Point of interest 306a is also shown. Because point of interest 306a is relatively isolated, it is likely that point of interest 306a is not part of the object being scanned, and is unlikely to provide valuable information at a later point in time for image recognition when the compact object representations including points of interest 301 and 302 are retrieved from a database and used for object identification. The shape around points of interest 301 is hollow presumably because there is no pattern on the bottom of the mug, and a mono-color surface such as the bottom of a mug provides no contrast which would create points of interest. For example, each point of interest indicated in FIGS. 3A, 3C, and 3D may have associated information about the brightness, color, or pattern of pixels surrounding the point of interest. When 3-D key points are created from 2D point of interests, the associated brightness, color, or pattern of pixels may be incorporated into the compact object representation in a way which may be useful for later object detection. It is the combination of 3-D key point descriptions and their relative geometric location that creates a unique signature for each object suitable for detection. In order for a key point extraction/descriptor computation system to be suitable for object detection, the resulting key points which make up an object representation stored in a database need to be invariant to a number of geometric transformations resulting from the changing position/orientation of a camera during query time, yet discriminative enough to avoid generating many false matches to features from different objects. By selecting key frames from multiple positions such as position 316 of FIG. 3A and position 318 of FIG. 3D, a sufficient amount of detail may be derived for the key points which make up the object representation 310 shown in FIG. 3E.

Figure 3D:
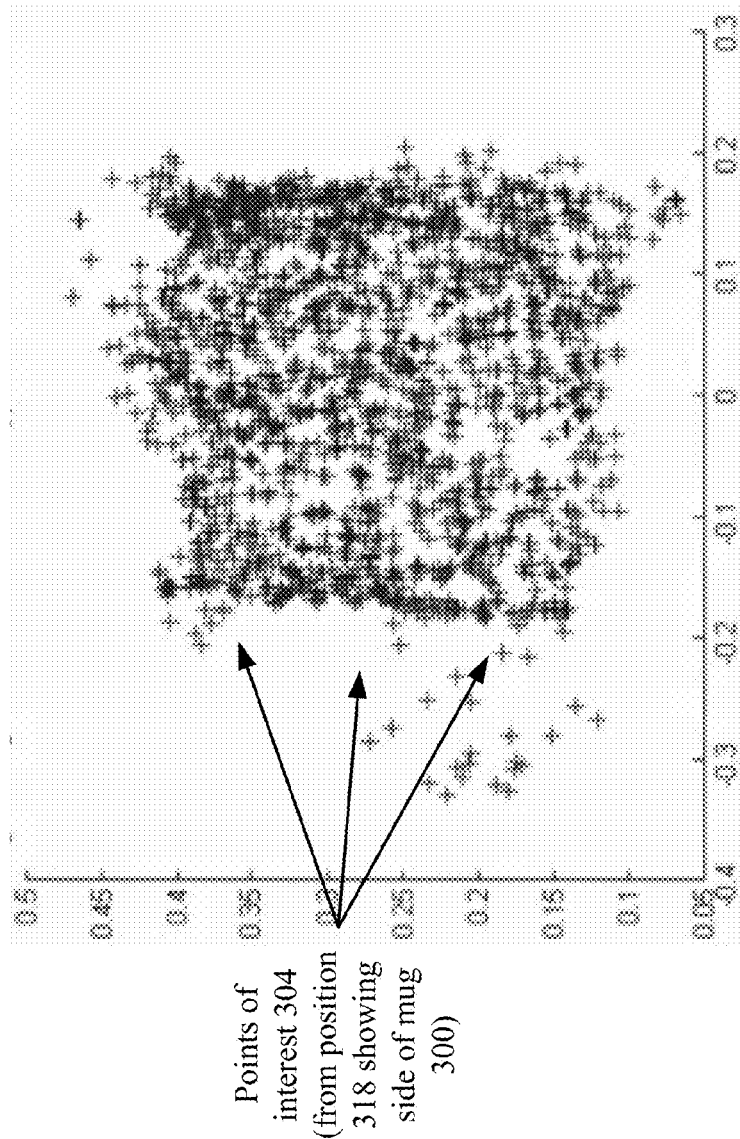
FIG. 3D illustrates aspects of one embodiment including filtered points of interest.
Figure 3E:
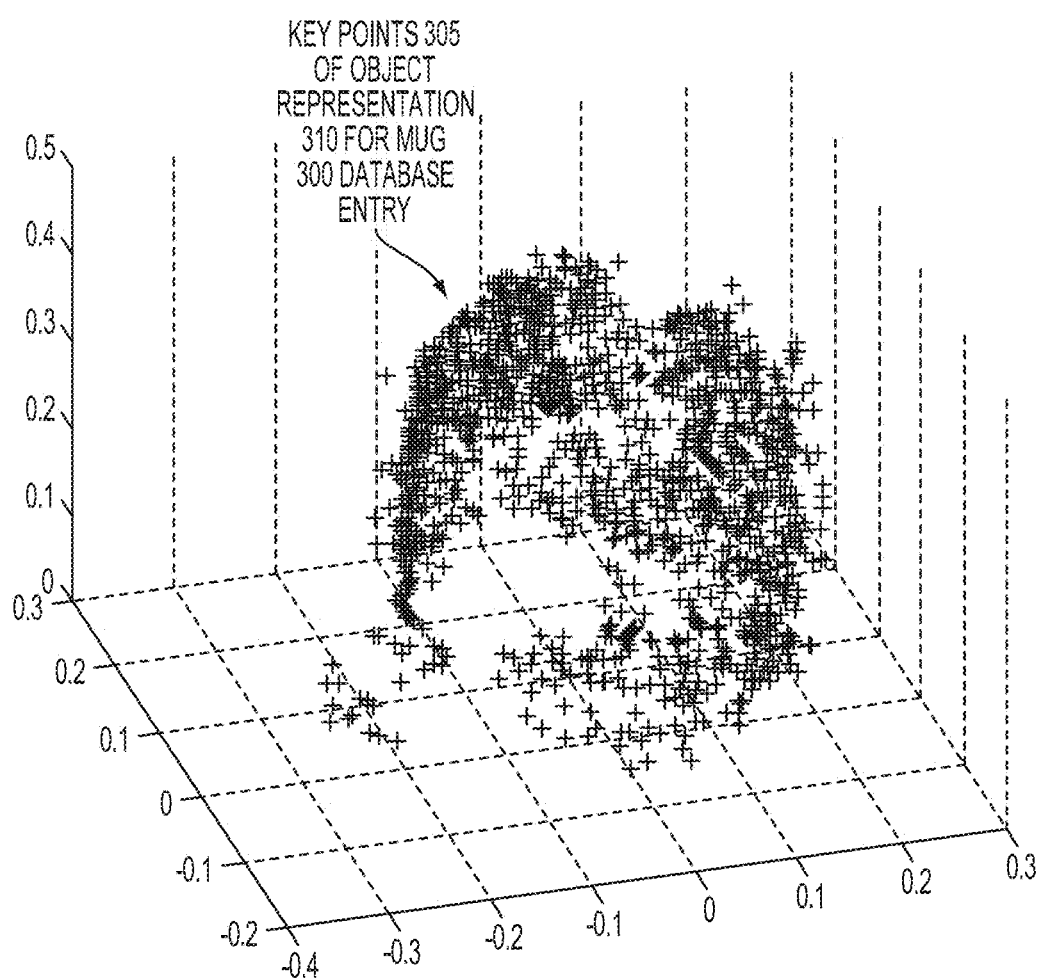
FIG. 3E illustrates aspects of one embodiment including 3-D key points that make up an object representation for storage in a database.

Thus, FIGS. 3A, 3C, and 3D show points of interest from key frames taken from one position at a given angle. FIG. 3A shows a top view points of interest prior to filtering. FIG. 3C shows a top view points of interest post filtering. FIG. 3D shows side view points of interest post filtering. The points of interest from each view are combined to create three dimensional key points 305 which make up object representation 310 of FIG. 3E. As part of the matching, points of interest 301 and points of interest 304 will be combined to create three dimensional key points 305 which are derived from the other key points. While points of interest from two key frames with different positions are shown in FIGS. 3C and 3D, any number of key frames from different views may contribute points of interest which are used to derive the key points that make up the final object representation. Further, it will be apparent that keyframes from each position may contribute to only a portion of the total number of three dimensional key points 305. This may be because a certain surface on an object is occluded from one view, or may be filtered or noisy in certain key frames from which the key points are derived.

As mentioned above, a single image taken from a single position such as image 122 taken from position 116 in FIG. 1 is essentially a two-dimensional projection from a scene captured by the image. Points of interest identified from such an image are associated with a detail descriptor describing the area around those points of interest in the two-dimensional projection captured by the image. A single point of interest may be associated with numerous planar descriptors, as points of interest associated with a single 3-D key point are typically visible from multiple key frames. Though these planar descriptors will, in general, look different even for very close yet different viewing angles, in practice, the descriptors corresponding to close viewing angles are relatively similar, and may be collapsed into a single descriptor that may be associated with a 3-D key point. Thus, regardless of how many key frames contain points of interest associated with a single 3-D key point, this 3-D key point will be associated with at most a handful of entries in the compact object representation.

A second image captured from a different angle will similarly capture information that is a two-dimensional projection of a three-dimensional object. The two images together include three-dimensional information about a single point collected from multiple two-dimensional projections, like shown in FIG. 4. Correlating points of interest from one key frame with points of interest from another key frame thus identify three-dimensional information which may be used to derive key points when key frames are taken from different angles. Merged points of interest thus not only identify the three-dimensional location of the key point in a standardized set of coordinates, but also may be associated with three-dimensional descriptive data about the volume surrounding the key point. Thus, in various embodiments, a system may establish correspondences between sets of two-dimensional points of interest across key frames in order to identify three-dimensional location of the key points of interest along with three-dimensional descriptive data. While certain types of filtering, such as boundary filtering, may be performed on the sets of two-dimensional points of interest from a single key frame, segmentation to identify an object may then be done on the correlated key points and not on sets of two-dimensional points of interest. In embodiments which function with this filtering, this eliminates repetitive segmentation/filtering on what may be large numbers of two-dimensional points of interest from key frames. This also enables use of all information about a 3-D key point location in space and the key point's relation to other key points, rather than only using two-dimensional information. Filtering on a single three-dimensional merged set of key points for an object representation may provide the same filtering as filtering on many sets of two-dimensional data.

In one example, a two minute scan of an object at a standard frame rate in moderate background clutter may produce approximately 15000 distinct points of interest of interest, out of which only approximately 1000-1500 key points may be derived which belong to the object, and further only 750-1000 key points may be suitable for object detection. FIG. 3A shows points of interest of a coffee mug which survived a first stage of segmentation—that by the three-dimensional location. Namely, in practical systems it is beneficial to define a bounding box of three-dimensional coordinates of the object with respect to a known target. At the first stage of object point of interest segmentation and filtering, all the collected points of interest that do not reside within this bounding box may be discarded. In a typical 2-minute object scan with moderate background clutter, an initial number of around 15000 distinct points of interest may be reduced to about 2000 key points during this step, such that an object representation such as object representation 310 may only use a fraction of the total points of interest that were in the key frames from which the object representation was derived. For a system that uses a target such as a target 130, coordinates for a scene with points of interest represented by FIGS. 3A and 3C may be tied to the middle of the target. A bounding volume may then be identified for key points belonging to the object. Some portion of the approximately 15000 points of interest may be identified as outside the bounding box, and may be filtered out and eliminated.

Further, in certain embodiments, a system may assume a certain density for points of interest belonging to an object. Segmentation to identify the object may be performed by filtering based on a threshold distance to a given number of nearest neighbors. FIG. 3B shows a histogram of estimated point of interest distances in three dimensions for an object such as in FIG. 3A. A filtering threshold 308 may be used to identify which pixels to filter. Because the point of interest 302 is in a dense area, it will be grouped with pixels to the left of the filtering threshold 308 in FIG. 3B. Point of interest 306a, however, is clearly not in a dense area of points of interest, and will be to the right of filtering threshold 308 in FIG. 3B. Thus, in FIG. 3C, filtered point of interest 306b is not shown as it would be deleted by the filtering process, when pixels to the right of filtering threshold 308 are deleted from the compact object representation.

In certain embodiments, a system performing segmentation may identify a dominant plane in a scene. A reference to the dominant plane may be used to define the scene and further assist in creating correspondence between points of interest from different images. In such systems there would be no need for explicitly known object (target) in the scene to assist with obtaining point of interest coordinates or segmentation. In particular, but the coordinate system of reference as well as the bounding box may be manually given by a user either at the time of the scan or during offline processing.

Additionally, in certain embodiments, particular methods may be used to identify points of interest. In certain embodiments, high density high gradient areas are identified, with thresholds used to determine which points are selected based on the gradient of surrounding pixels. In still further embodiments, images are processed at various scales to detect preferred points of interest in a key frame which are observable at a particular scale. Selection of key points and/or points of interest as well as their description may be performed in a variety of ways using such transforms, including analysis of feature orientations with offsets (the scale at which surrounding intensity differences or curvature are most pronounced), analysis of surrounding pixels with principal component analysis, and use of steerable filters with Gaussian derivative filters. Additionally, differential invariants may be identified for given key points with selection based on the values invariant to rotation. Also, shape context descriptors may be used to represent an area of interest. In further embodiments, any combination of such selection criteria, along with any other selection criteria that may optimize the creation of compact object representation suitable for assisting with offline object detection, may be used to identify points of interest or key points.

Figure 4:
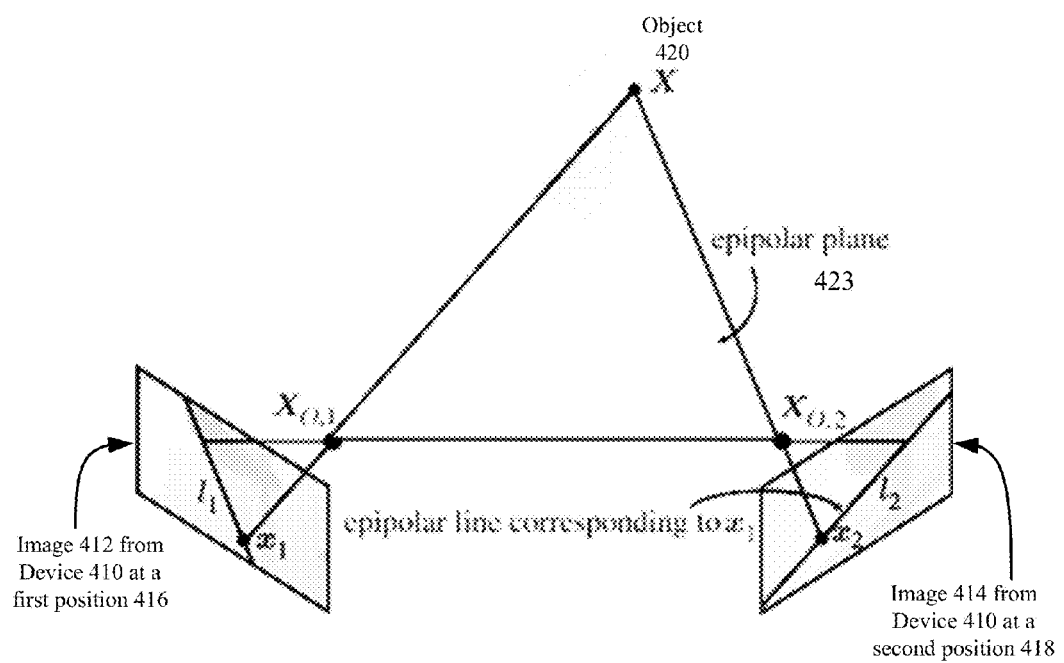
FIG. 4 illustrates aspects of one embodiment related to triangulation.

FIG. 4 then provides details for one embodiment whereby correspondences may be established for key frames. In one example, images 112 and 114 of FIG. 1 may be key frames that have correspondences established. FIG. 4 shows images 412 and 414 of object 420 taken by device 410 from two different positions, with epipolar plane 423. Image 412 is taken from first position 416 and image 414 is taken from second position 418. Object 420 is shown as having a point of interest X. In image 412, point of interest X is imaged as point of interest $x_1$. In image 414, point of interest X is imaged as point of interest $x_2$.

If a system only has image information, it is unlikely to be able to consistently associate $x_1$ with $x_2$. However, given an observation $x_1$ of X, and knowledge of the relative position between position 416 and second position 418, the epipolar line $l_1$ corresponding to $x_1$ can be identified in image 414. Point of interest $x_2$ may be extracted in image 414 along with descriptive information for surrounding pixels if (A) the descriptions of the surrounding pixels are sufficiently close between the two point of interest observations (e.g. the distance in the descriptor domain is below a threshold), and (B) $x_2$ is below a threshold distance to the epipolar line $l_2$. The threshold distance in the descriptor domain and the threshold distance from the epipolar line corresponding to x(1) may be selectable parameters within a system. These may be set automatically, or may be selected by a user with a user interface.

One threshold value for a maximum epipolar line distance may be two pixels, three pixels, or four pixels. Values may be used other than these threshold epipolar line distance values in other embodiments. Example descriptor distance threshold values may be set as a fixed difference between descriptive information, or may be set as a fraction of a normalized descriptor value. For example, if a 128-element long descriptor is normalized to a value of 1, squared distances considered which would indicate a same point of interest is observed may be a portion of that normalized range, such as between 0.2 and 0.35 of the normalized value. In other words, this is checking that the area surrounding a point of interest is consistently identified as associated with other points of interest when multiple key frames are merged.

The two thresholds together are essentially a check to make sure that the two points of interest are actually capable of being corresponding points of interest given the position and information associated with the points of interest. For both of these thresholds, relaxing the parameter leads to a higher number of correspondences, and thus potentially higher number of points of interest successfully extracted. In other words, as two-dimensional points of interest are correlated with other two-dimensional points of interest to create three-dimensional key points, more three-dimensional key points are identified as the thresholds are relaxed, at the price of a higher number of errors. These errors may be in the form of incorrect or fictitious points of interest or key points which include partially or completely incorrect data. Many of the points of interest floating outside the object shown in FIG. 3A, such as point of interest 306a, are presumably identified and triangulated using erroneous correspondences. Later, filtering and segmentation may identify and remove a portion of these fictitious points.

Further, in certain embodiments, similar calculations may be used for triangulation and bundle adjustment in identifying the location of the points of interest X in a more robust fashion. Bundle adjustment may refer to assessing and adjusting the matching of points of interest from three or more different key frames at one time. In FIG. 4, the first projection of the point of interest X at first position 416 is shown as $X_{0,1}$ and the second projection of the point of interest X at the second position 418 is shown as $X_{0,2}$. If the image in FIG. 4 is a target such as target 130, a system will be able to associate points of interest from different images using previously provided information about the position and orientation of the target. Given the information about these correspondences, the location of the focal points can be triangulated. Such an estimate may be noisy since sub-pixel errors in the position of the points of interest x may result in a large error in the calculated position of the point of interest X These errors may be reduced by multiple observations at the same point. Moreover, by minimizing the re-projection error of an estimated location, bundle adjustment may at the same time correct the initial information about the camera poses in key frames, for example, frames 412 and 414 in FIG. 4.

Bundle adjustments may further be used when more than two correspondences and positions are used from more than two key frames, resulting in a much greater confidence in the resulting locations for all associated points of interest X, Y, and Z due to the averaged information. Further, when such a bundle adjustment is performed using both tracking and detection of points of interest, accuracy is further improved.

Also, as mentioned above, additional sensors in a device may be used to further improve the accuracy of the relative positioning of the device when capturing key frames. Accelerometers, gyroscopes, and various other positioning systems that measure location and movement of a device may be used either to replace or to supplement the above described position measurements. This may provide increased accuracy or reduced processor usage in certain embodiments. In certain embodiments, these positioning systems may be used to determine the position or pose of a device when the device captures a particular key frame. This information may be used to create information about the key points which are derived from two dimensional points of interest in particular key frames.

In certain embodiments, the descriptive information about pixels surrounding points of interest may be selected as having a large influence on the matching decision, due to the straightforward process of matching actual pixels between images. For many objects, however, multiple observations of the same point of interest tend to vary gradually but persistently over multiple views. This may be due to changes in surface reflectance, varying self-occlusions on the object, or simply the nature of projective views. Because of this it is possible to end up with several clusters of key point groupings where the descriptors for each grouping satisfy certain common filter requirements, but not others. For example, descriptors within each cluster may satisfy maximum distance requirements, but may not satisfy maximum distance requirements across clusters. This can lead to several three-dimensional key point matches being estimated where only one exists. Thus, in certain embodiments, observations in the intersection between descriptor clusters may be made. These provide a link between points of interest and additional information for decision making on whether to merge multiple points of interest or correspondence sets of points. It further provides added robustness to any bundle adjustment, and can serve as a precursor to pruning extra or unnecessary data. Bundle adjustment process may benefit from merging correspondences across clusters of views, as the same point of interest X is then estimated based on more data, instead of estimating two distinct points X and X', out of which one is fictitious. This may also be combined with other pruning or data filtering techniques to optimize data to be stored as compact object representation in a database, where merged points of interest from multiple frames may be stored as a single key point with associated descriptive data on the object around the key point. Alternatively, in some instances it is beneficial to have multiple instances of the same three-dimensional point location X but two or more distinct descriptors associated with it. This may be the case when the descriptor difference across multiple views is so pronounced that the matching pipeline cannot form associations between the single descriptor in the database, and corresponding descriptors extracted from "distant" query views of the same location X.

Following bundle adjustment, each point of interest X visible from at least two viewpoints is now represented by its three-dimensional location and multiple descriptors each one typically corresponding to one distinct key frame where the point was observed during the scan. This step is typically followed by segmentation and filtering techniques aimed at removing the key points which are not associated with the object of interest. This methods typically only rely on three-dimensional locations ($x_1$, $x_2$, $x_3$) of all captured key points, and as such may be combined with steps for bundle adjustment, as three-dimensional locations are already known at this step. The final step in the process for forming a compact object representation following a scan is called feature pruning. Namely, the surviving points of interest X are now associated with at least two, and typically several descriptors. Location of a point of interest together with the attached description is sometimes referred to as "feature". Thus there may be many features associated with a single key point at one particular set of three dimensional coordinates, and the objective is to avoid repeating, compress the representation size, but also minimize confusion by pruning some of these features, where pruning is the combined effect of removing certain descriptors and combining multiple surviving descriptors to form a reduced number of new "pruned" descriptors. This pruning may be performed by a module implementing a series of pruning steps. Such steps may filter points of interest based on repeatability for the number of different images and viewpoints for which a point of interest is observed as a feature detected as a key point. This may also filter based on discriminativity, such that a fraction of similar features that correspond to the same key point in multiple views is selected. The key points for the remaining fraction of similar features are removed to reduce redundancy in compact object representation.

In certain embodiments, an analysis may be performed that associates a value with key points in order to optimize the size of an object representation. A value threshold may be established, such that key points that are redundant or otherwise less valuable are removed, while unique and highly visible key points may be saved with a score above a data value threshold.

In further embodiments, different pruning steps may be used depending on the processing resources available to the device and other choices selected by a user. Examples of additional parameters that may control the level of key point pruning include: a radius of an epsilon ball in a multi-dimensional descriptor space to determine if pixels around key points are sufficiently similar; a radius of an epsilon ball in a three-dimensional space to determine that distinct key points are bundled very closely together in Euclidean space; a repeatability threshold based on number of views of a particular key point; and a discriminativity threshold based on feature changes identified for a single key point in multiple views.

One embodiment may thus involve capturing, using a camera module of a mobile computing device, a plurality of images of a scene. Each of the plurality of images of the scene includes an image of at least a portion of a first object. A camera position or "camera pose," consisting of six degrees of freedom and a position in three dimensions with respect to a world coordinate system in which the object of interest is unmoving is presumed known for each one of the captured images. The camera pose may be obtained in various ways: either by carefully calibrating a fixed setup (like with a robotic arm), or by detecting and tracking the projective appearance of a known object "target" present in the same scene with the object being scanned. A first image of the plurality of images may then be identified as a first key frame, where the first image is captured by the mobile computing device from a first position. A second image of the plurality of images may be selected as a second key frame. The second image is captured by the mobile computing device from a second position that is different from the first position. A first plurality of points of interest may be identified from the first key frame, where the first plurality of points of interest identifies features from the scene. A second plurality of points of interest may be identified from the second key frame. A system may then match the first plurality of points of interest and the second plurality of points of interest, and identify key points associated with the object. The key points associated with the object may next be associated with at least one description of the area surrounding each key point, and together they may be stored as compact object representations in an object detection database.

In an alternative embodiment, a device may operate a SLAM system. A SLAM system is a standard system for using imaging data to build up a map within an unknown environment (without a priori knowledge), or to update a map within a known environment (with a priori knowledge from a given map), while at the same time keeping track of their current location from imaging data. In the embodiments described herein, rather than building an environment or scene, the map data from a standard SLAM system is used to build a map of the object using key points created as described above. The SLAM system selects key frames from images as described above, as standard operation of the SLAM system includes the creation of key frames as part of SLAM operation. Scene mapping and device position tracking may be used as a tool for extracting salient features and structural properties of the object as described above. In this way, the image capture and key frame selection may be performed by the SLAM system. The overall system may provide the key frames from the SLAM system to a separate extractor and descriptor system. This extractor and descriptor system may then be run on key frames to extract object appearance information. Separate SLAM and extractor/descriptor systems may provide benefits in certain embodiments as a simpler and cheaper system for tracking, map building, and localization. The overall system may be more complex, but may also provide more efficient discrimination and invariant point of interest detection. The descriptor system may then establish the key point correspondence across key frames, and perform any remaining steps.

Such an embodiment may use SLAM to select and store key frames using a number of criteria, including camera position stability, a number of sufficiently "different" features extracted, and other such metrics. SLAM key frames may thus be used unmodified for detection feature extraction. Other embodiments may enable custom key frame selection targeted to automatically create key frames more in tune with database creation. Either of these embodiments enables automated key frame selection which may be hidden from the user as an object is scanned.

In certain embodiments, a SLAM system is implemented in a multithreaded fashion, with key point feature extraction running in a background process. Descriptors which are extracted with points of interest may correspond to projective object view within particular key frames. In order to encode mutual geometry between key points, traditional multi-view epipolar geometry techniques may be used by certain embodiments as described above.

In various alternative embodiments, the points of interest may be filtered before matching points of interest between images to create key points, after such matching, or both before and after. Further embodiments may use detection as well as SLAM features and their correspondences across multiple key frames to robustly estimate three-dimensional key point location. Further embodiments may also post-process key point data to prune extracted multi-view detection features and create compact object representations for an object detection database.

In one embodiment, a user interface may provide a different key frame selection criterion that can be targeted to optimize compact object representations for database creation. In certain embodiments, a display may present extracted and triangulated key points in near real time to visualize the scanning process. In certain embodiments, this may enable a user to alter parameters on the fly to adjust key point creation as key frames are selected.

Figure 5:
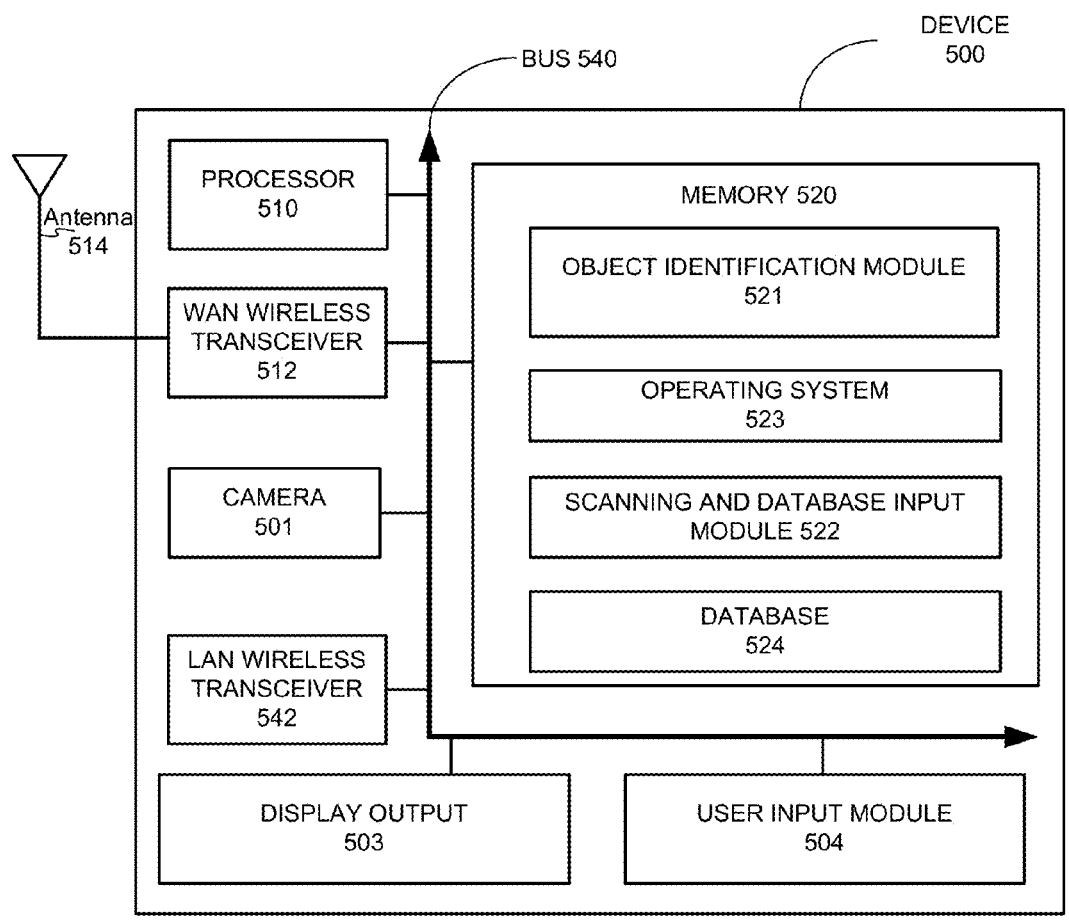
FIG. 5 is one embodiment of a device for use with various embodiments described herein.

FIG. 5 now describes one implementation of a device 500 according to certain embodiments. As described above, FIGS. 1 and 5 illustrate a system which, in one embodiment, may include a device 110 or 410 which is used to scan an object. Device 500 may be one embodiment of device 110 or device 410 and may perform all of the elements of a method for creating compact object representations for an object detection database. In the embodiment of device 500 shown in FIG. 5, specialized modules may be used to implement object scanning including object identification module 521 and scanning and database input module 522. Database 524 may be a specialized compact object representation base or may be part of a larger database system. Object identification module 521 may be a module which implements SLAM as described herein, or may be a customized module for identifying key frames. In certain embodiments, object identification module 521 and database input module 522 may be implemented as a single module.

Additionally, in certain embodiments, a control module or a control input for object identification module 521 and/or scanning and database input module 522 may enable manual selection of various scanning aspects. For example, a user may elect to have automatic prompts presented at display output 503 when key frames are sparse at certain angles to determine when more key frames from different angles are needed. Such a system may also enable prompts and directions to specific angles where high value key point data is expected. In certain embodiments, such a system may essentially track a key point density and/or a point of interest density around certain portions of an object. For a given image, the system may determine a spatial relationship between the location from which the image is taken and the location that the nearest key frame was taken from, and use this information along with point of interest information for these locations to determine the value of an additional key frame from the new location.

The system may thus inform a user when additional key frames would provide high data value from certain angles. Such a control may also enable a user to customize selection of key frames, or to update selection of key frames for an in-progress scan. In certain embodiments, this may also enable a user to view recorded images and to manually select specific images as key frames. Further still, thresholds for key point pruning and filtering may be set by user selection.

In the embodiment shown at FIG. 5, mobile device 500 includes processor 510 configured to execute instructions for performing operations at a number of components and can be, for example, a general-purpose processor or microprocessor suitable for implementation within a portable electronic device. Processor 510 may thus implement any or all of the specific steps for compact object representation creation described herein. Processor 510 is communicatively coupled with a plurality of components within mobile device 500. To realize this communicative coupling, processor 510 may communicate with the other illustrated components across a bus 540. Bus 540 can be any subsystem adapted to transfer data within mobile device 500. Bus 540 can be a plurality of computer buses and include additional circuitry to transfer data.

Memory 520 may be coupled to processor 510. In some embodiments, memory 520 offers both short-term and long-term storage and may in fact be divided into several units. Memory 520 may be volatile, such as static random access memory (SRAM) and/or dynamic random access memory (DRAM) and/or non-volatile, such as read-only memory (ROM), flash memory, and the like. Furthermore, memory 520 can include removable storage devices, such as secure digital (SD) cards. Thus, memory 520 provides storage of computer-readable instructions, data structures, program modules, and other data for mobile device 500. In some embodiments, memory 520 may be distributed into different hardware modules.

In some embodiments, memory 520 stores a plurality of application modules. Application modules contain particular instructions to be executed by processor 510. In alternative embodiments, other hardware modules may additionally execute certain applications or parts of applications. Memory 520 may be used to store computer-readable instructions for modules that implement scanning according to certain embodiments, and may also store compact object representations as part of a database.

In some embodiments, memory 520 includes an operating system 523. Operating system 523 may be operable to initiate the execution of the instructions provided by application modules and/or manage other hardware modules as well as interfaces with communication modules which may use WAN wireless transceiver 512 and LAN wireless transceiver 542. Operating system 523 may be adapted to perform other operations across the components of mobile device 500 including threading, resource management, data storage control and other similar functionality.

In some embodiments, mobile device 500 includes a plurality of other hardware modules. Each of other hardware modules is a physical module within mobile device 500. However, while each of the hardware modules is permanently configured as a structure, a respective one of hardware modules may be temporarily configured to perform specific functions or temporarily activated. A common example is an application module that may program a camera 501 (i.e., hardware module) for shutter release and image capture. Such a camera module may be used to capture images such as images 122 and 124 of FIG. 1 and images 412 and 414 of FIG. 4.

Other hardware modules can be, for example, an accelerometer, a Wi-Fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth®[1] transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the hardware modules may be implemented in software. Further, as described herein, certain hardware modules such as the accelerometer, the GPS module, the gyroscope, the inertial sensor, or other such modules may be used to estimate relative locations between key frames. This information may be used to improve data quality in conjunction with image based techniques described above, or may replace such methods in order to conserve processor resources. In certain embodiments, a user may use a user input module 504 to select such options.

Mobile device 500 may include a component such as wireless communication module which may integrate an antenna 514 and wireless transceiver 512 with any other hardware, firmware, or software necessary for wireless communications. Such a wireless communication module may be configured to receive signals from various devices such as data sources via networks and access points such as a network access point. In certain embodiments, compact object representations may be communicated to server computers, other mobile devices, or other networked computing devices to be stored in a remote database and used by multiple other devices when the devices execute object recognition functionality.

In addition to other hardware modules and applications in memory 520, mobile device 500 may have a display output 503 and a user input module 504. Display output 503 graphically presents information from mobile device 500 to the user. This information may be derived from one or more application modules, one or more hardware modules, a combination thereof, or any other suitable means for resolving graphical content for the user (e.g., by operating system 523). Display output 503 can be liquid crystal display (LCD) technology, light-emitting polymer display (LPD) technology, or some other display technology. In some embodiments, display module 503 is a capacitive or resistive touch screen and may be sensitive to haptic and/or tactile contact with a user. In such embodiments, the display output 503 can comprise a multi-touch-sensitive display. Display output 503 may then be used to display any number of outputs associated with an object identification module 521, such as an augmented reality output using object recognition in conjunction with compact object representations from database 524. Interface selections may also be displayed to select scanning and storage options. Key points may also be displayed along with an image of the object in real time as an object is scanned.

Figure 6:
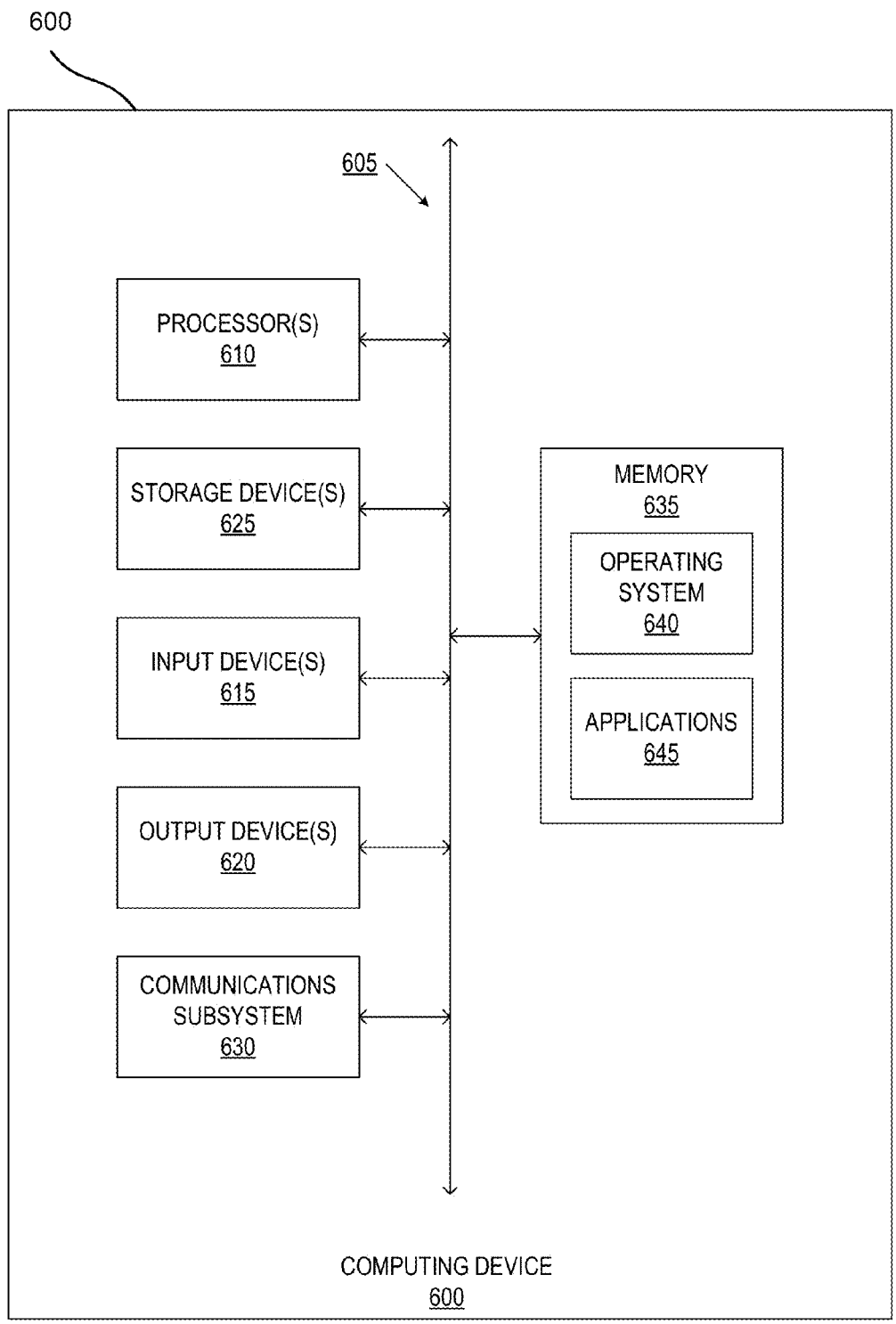
FIG. 6 is one embodiment of a computing device for use with various embodiments described herein.

FIG. 6 provides a schematic illustration of one embodiment of a computing device 600 that may be used with various other embodiments such as the embodiments described by FIGS. 1-5 as described herein. FIG. 6 is meant only to provide a generalized illustration of various components, any or all of which may be utilized as appropriate. In certain embodiments, for example, components of FIG. 6 and FIG. 5 may be included in a single device, or in multiple distributed devices which may comprise one particular embodiment. FIG. 6, therefore, broadly illustrates how individual system elements may be implemented in a relatively separated or relatively more integrated manner, and describes elements that may implement specific methods according to embodiments when, for example, controlled by computer-readable instructions from a non-transitory computer-readable storage device, such as storage devices 625.

The computing device 600 is shown comprising hardware elements that can be electrically coupled via a bus 605 (or may otherwise be in communication, as appropriate). The hardware elements may include: one or more processors 610, including, without limitation, one or more general-purpose processors and/or one or more special-purpose processors (such as digital signal processing chips, graphics acceleration processors, and/or the like); one or more input devices 615, which can include, without limitation, a mouse, a keyboard and/or the like; and one or more output devices 620, which can include, without limitation, a display device, a printer and/or the like.

The computing device 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computing device 600 might also include a communications subsystem 630, which can include without limitation a modem, a network card (wireless or wired), an infrared communication device, a wireless communication device and/or chipset (such as a Bluetooth device, a 702.11 device, a Wi-Fi device, a WiMax device, cellular communication facilities, etc.), and/or similar communication interfaces. The communications subsystem 630 may permit data to be exchanged with a network (such as the network described below, to name one example), other computer systems, and/or any other devices described herein. A mobile device such as mobile device 500 may thus include other communication subsystems in addition to those including wireless transceiver 512 and LAN wireless transceiver 542.

In many embodiments, the computing device 600 will further comprise a non-transitory working memory 635, which can include a RAM or ROM device, as described above. The computing device 600 also can comprise software elements, shown as being currently located within the working memory 635, including an operating system 640, device drivers, executable libraries, and/or other code, such as one or more applications 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general-purpose computer (or other device) to perform one or more operations in accordance with the described methods for scanning an object to identify key frames, points of interest, key points, to create an object representation, to store that object representation in a database, and to retrieve the object representation for object identification in a later scan of an unknown or partially unknown scene.

A set of these instructions and/or code might be stored on a computer-readable storage medium, such as the storage device(s) 625 described above. In some cases, the storage medium might be incorporated within a computer system, such as computing device 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computing device 600 and/or might take the form of source and/or installable code, which, upon compilation and/or installation on the computing device 600 (e.g., using any of a variety of generally available compilers, installation programs, compression/decompression utilities, etc.) then takes the form of executable code. Object identification module 521 and scanning and database input module 522 may thus be executable code as described herein. In alternative embodiments, these modules may be hardware, firmware, executable instructions, or any combination of these implementations.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. An activity selection subsystem configured to provide some or all of the features described herein relating to the selection of acceptable characteristics for an output of three-dimensional key points created from multiple two-dimensional points of interest derived from single key frames, and such subsystems comprise hardware and/or software that is specialized (e.g., an application-specific integrated circuit (ASIC), a software method, etc.) or generic (e.g., processor(s) 610, applications 645 which may, for example, implement any module within memory 635, etc.) Further, connection to other computing devices such as network input/output devices may be employed.

The terms "machine-readable medium" and "computer-readable medium," as used herein, refer to any medium that participates in providing data that causes a machine to operate in a specific fashion. In an embodiment implemented using the computing device 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including, but not limited to, non-volatile media, non-transitory media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communications subsystem 630 (and/or the media by which the communications subsystem 630 provides communication with other devices).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code. Any such memory may function as memory 520 or memory 635 or as secure memory if structured to maintain security of stored content. In certain embodiments, object representations may have a certain level of associated security, and may be stored in portions of memory 635 associated with certain security or privacy setting.

The communications subsystem 630 (and/or components thereof) generally will receive the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

In various embodiments as described herein, computing devices may be networked in order to communicate information. For example, mobile device 500 may be networked to receive information or communicate with a remote object representation database as described above. Additionally, each of these elements may engage in networked communications with other devices such as web servers, databases, or computers which provide access to information to enable applications via network.

Figure 7:
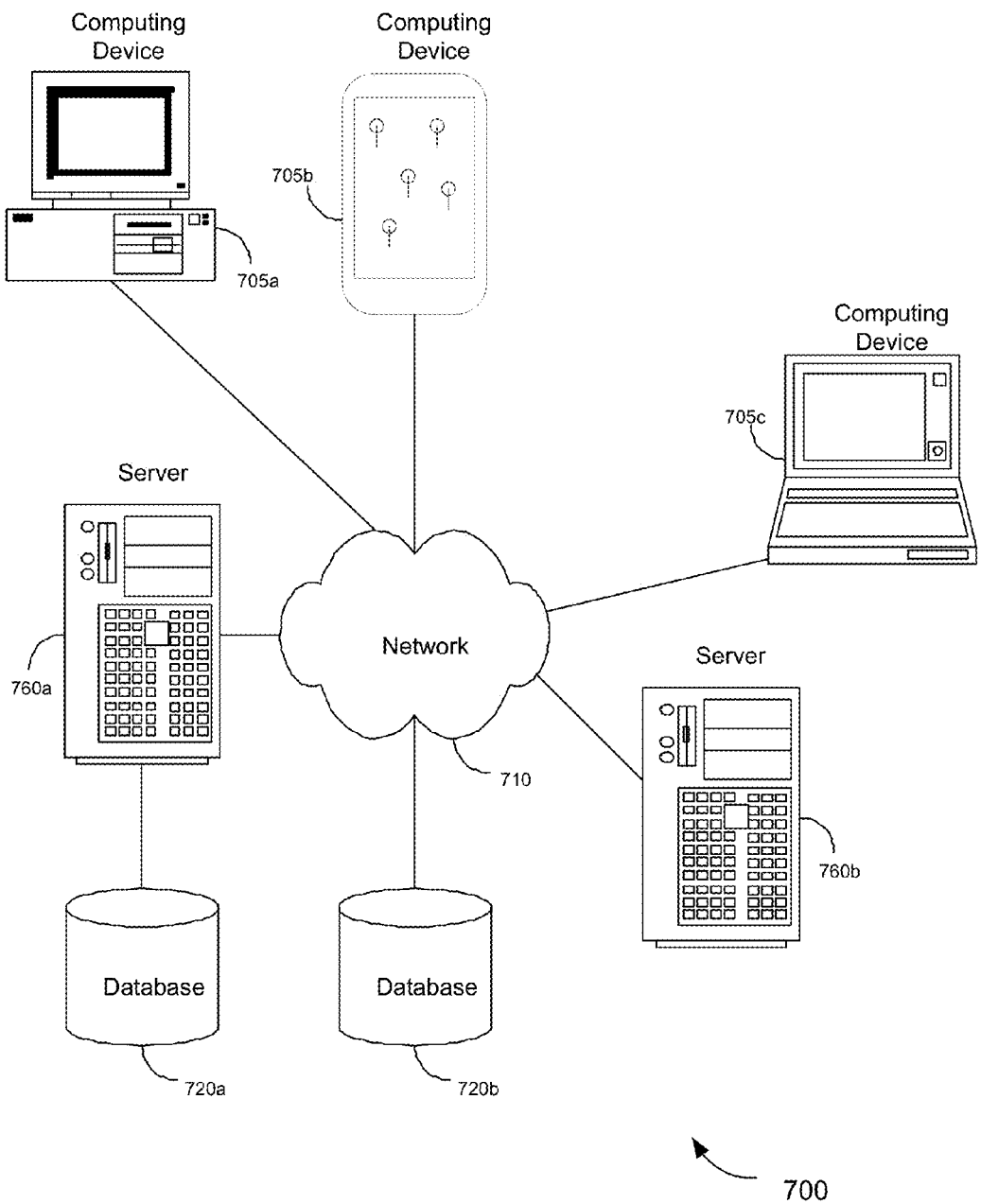
FIG. 7 is one embodiment of a network system which may connect devices and databases in various embodiments described herein.

FIG. 7 illustrates a schematic diagram of a system 700 of networked computing devices that can be used in accordance with various embodiments to enable systems such as system 700 or other systems that may implement systems for creating and storing object representations for later use in identifying objects. For example, in various embodiments, the output object representation may be communicated via networked computers to one or more databases as described by system 700. The system 700 can include one or more user computing devices 705. The user computing devices 705 can be general-purpose personal computers (including, merely by way of example, personal computers and/or laptop computers running any appropriate flavor of Microsoft® Windows®[2] and/or Mac OS®[3] operating systems) and/or workstation computers running any of a variety of commercially-available UNIX®[4] or UNIX-like operating systems. These user computing devices 705 can also have any of a variety of applications, including one or more applications configured to perform methods of the invention, as well as one or more office applications, database client and/or server applications, and web browser applications. Alternatively, the user computing devices 705 can be any other electronic device, such as a thin-client computer, Internet-enabled mobile telephone, and/or personal digital assistant (PDA), capable of communicating via a network (e.g., the network 710 described below) and/or displaying and navigating web pages or other types of electronic documents. Although the exemplary system 700 is shown with three user computing devices 705a,b,c, any number of user computing devices can be supported.

Certain embodiments of the invention operate in a networked environment, which can include a network 710. The network 710 can be any type of network familiar to those skilled in the art that can support data communications using any of a variety of commercially-available protocols, including, without limitation, TCP/IP, SNA, IPX, AppleTalk®[3], and the like. Merely by way of example, the network 710 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, the Bluetooth protocol known in the art, and/or any other wireless protocol; and/or any combination of these and/or other networks. Network 710 may include access points for enabling access to network 710 by various computing devices.

Embodiments of the invention can include one or more server computers 760. Each of the server computers 760a,b may be configured with an operating system, including, without limitation, any of those discussed above, as well as any commercially (or freely) available server operating systems. Each of the server computers 760a,b may also be running one or more applications, which can be configured to provide services to one or more user computing devices 705 and/or other server computers 760.

Merely by way of example, one of the server computers 760 may be a web server, which can be used, merely by way of example, to process requests for web pages or other electronic documents from user computing devices 705. The web server can also run a variety of server applications, including HTTP servers, FTP servers, CGI servers, database servers, Java®[5] servers, and the like. In some embodiments of the invention, the web server may be configured to serve web pages that can be operated within a web browser on one or more of the user computing devices 705 to perform methods of the invention. Such servers may be associated with particular IP addresses, or may be associated with modules having a particular URL, and may thus store secure navigation modules which may interact with a mobile device such as mobile device 500 to provide secure indications of geographic points as part of location services provided to mobile device 500.

In accordance with further embodiments, one or more server computers 760 can function as a file server and/or can include one or more of the files (e.g., application code, data files, etc.) necessary to implement methods of various embodiments incorporated by an application running on a user computing device 705 and/or another server computer 760. Alternatively, as those skilled in the art will appreciate, a file server can include all necessary files, allowing such an application to be invoked remotely by a user computing device 705 and/or server computer 760. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720a might reside on a storage medium local to (and/or resident in) a server 760a (and/or a user computing device 705). Alternatively, a database 720b can be remote from any or all of the user computing devices 705 or server computers 760, so long as the database 720b can be in communication (e.g., via the network 710) with one or more of these. In a particular set of embodiments, a database 720 can reside in a storage-area network ("SAN") familiar to those skilled in the art. (Likewise, any necessary files for performing the functions attributed to the user computing devices 705 or server computers 760 can be stored locally on the respective computer and/or remotely, as appropriate.) In one set of embodiments, the database 720 can be a relational database, such as an Oracle®[5] database, that is adapted to store, update, and retrieve data in response to SQL-formatted commands. The database might be controlled and/or maintained by a database server, as described above, for example. Such databases may store information relevant to levels of security.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Specific details are given in the description to provide a thorough understanding of the embodiments. However, embodiments may be practiced without certain specific details. For example, well-known circuits, processes, algorithms, structures, and techniques have been mentioned without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes which may be depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Additionally, the above elements may merely be a component of a larger system, wherein other rules may take precedence over or otherwise modify the application various embodiments, and any number of steps may be undertaken before, during, or after the elements of any embodiment are implemented.

Having described several embodiments, it will therefore be clear to a person of ordinary skill that various modifications, alternative constructions, and equivalents may be used without departing from the spirit of the disclosure.

APPENDIX TO THE SPECIFICATION

[1] The "Bluetooth" word mark and logos are registered trademarks owned by Bluetooth SIG, Inc. Other trademarks and trade names are those of their respective owners.

[2] "Microsoft" and "Windows" are either registered trademarks or trademarks of Microsoft Corporation in the United States and/or other countries.

[3] "Mac OS" and "AppleTalk" are registered trademarks of Apple, Inc., registered in the U.S. and other countries.

[4] "UNIX" is a registered trademark of The Open Group.

[5] "Java" and "Oracle" are registered trademarks of Oracle and/or its affiliates. Other names may be trademarks of their respective owners.

We claim:

1. A method of capturing compact representations of three-dimensional objects suitable for object detection comprising:
   capturing, using a camera module of a device, a plurality of images of a scene, wherein each of the plurality of images of the scene captures at least a portion of an object;
   identifying a first key frame from the plurality of images and a first position of the device associated with the first key frame;
   identifying a second key frame from the plurality of images and a second position of the device associated with the second key frame, and wherein the second position is different from the first position;
   identifying a first plurality of points of interest from the first key frame, wherein each of the first plurality of points of interest identify one or more features from the scene;
   identifying a second plurality of points of interest from the second key frame, wherein each of the second plurality of points of interest identify one or more of the features from the scene;
   matching a subset of the first plurality of points of interest and a subset of the second plurality of points of interest;
   identifying a plurality of key points associated with the object based at least in part on the matching of the subset of the first plurality of points of interest and the subset of the second plurality of points of interest, and deleting points of interest with a mean distance to a threshold number of nearest points of interest that is more than a threshold distance; and
   storing at least a portion of the plurality of key points associated with the object as an object representation in an object detection database.

2. The method of claim 1 wherein identifying the plurality of key points associated with the object comprises:
   filtering the first plurality of points of interest and the second plurality of points of interest to identify the at least a portion of the plurality of key points which are associated with the object.

3. The method of claim 2 wherein filtering the first plurality of points of interest and the second plurality of points of interest comprises one or more of:
   deleting the points of interest that are not matched with points of interest from other key frames; and
   deleting the key points outside of a defined volume of interest of the scene.

4. The method of claim 1 wherein the scene further comprises a planar target.

5. The method of claim 4 wherein the planar target is used to assist in defining a volume of interest of the scene.

6. The method of claim 4 wherein matching the first plurality of points of interest and the second plurality of points of interest comprises:
   identifying the first position of the device from a first location of the planar target in the first image;
   identifying the second position of the device from a second location of the planar target in the second image;
   determining a relative position between the first position of the device and the second position of the device;
   matching the first plurality of points of interest and the second plurality of points of interest based on the relative position between the first position and the second position; and
   determining and recording a position of each key point in a coordinate system.

7. The method of claim 1 wherein each key point comprises key point location information and for pixels surrounding the key point.

8. The method of claim 1 wherein identifying the first image as the first key frame comprises a user selection.

9. The method of claim 1 wherein identifying the first image as the first key frame comprises an automatic selection by the device.

10. The method of claim 9 wherein identifying the second image as the second key frame comprises:
    identifying a key point density within the second image;
    identifying a spatial relationship between the second position and the first position;
    determining that a key frame at the second position would provide data with a data value above a threshold value for use in the object representation; and
    selecting the second image as the second key frame.

11. A device for capturing compact representations of three-dimensional objects suitable for offline object detection comprising:
    a camera module of a device that captures a plurality of images of a scene, wherein each of the plurality of images of the scene captures at least a portion of an object;
    one or more processors that (1) identifies a first key frame and a first position of the device associated with the first key frame; (2) identifies a second key frame and a second position of the device associated with the second key frame, wherein the second position is different from the first position; (3) identifies a first plurality of points of interest from the first key frame, wherein the first plurality of points of interest identify features from the scene; (4) identifies a second plurality of points of interest from the second key frame, wherein the second plurality of points of interest identify at least a portion of the features from the scene; (5) matches a portion of the first plurality of points of interest and a portion the second plurality of points of interest; and (6) identifies a plurality of key points associated with the object based at least in part on the matching of the portion of the first plurality of points of interest and the portion of the second plurality of points of interest and deleting points of interest with a mean distance to a threshold number of nearest points of interest that is more than a threshold distance; and
    a memory that stores at least a portion of the plurality of key points associated with the object as an object representation in an object detection database.

12. The device of claim 11 wherein the device further comprises:
    a display coupled to the camera module, wherein the display outputs an image of at least a portion of the plurality of key points as the camera module of the device captures at least a portion of the plurality of images of the scene.

13. The device of claim 12 wherein the display further outputs a video image of the scene with at least a second portion of the plurality of key points overlaid on the object.

14. The device of claim 11 wherein the device further comprises:

a motion sensor, wherein the second position of the device is identified by the one or more processors using information from the motion sensor.

15. The device of claim 11 wherein the device further comprises:
a user input module, wherein identifying the first key frame comprises a user selection received at the user input module of the device.

16. The device of claim 15 wherein the device further comprises:
an antenna; and
a wireless transceiver;
wherein the one or more processors are coupled to the device via a network, the antenna, and the wireless transceiver.

17. A non-transitory computer-readable medium comprising instructions that, when executed by a processor coupled to the non-transitory computer-readable medium cause a device to:
capture, using a camera module of the device, a plurality of images of a scene, wherein each of the plurality of images of the scene captures at least a portion of an object;
identify a first key frame and a first position of the device associated with the first key frame;
identify a second key frame and a second position of the device associated with the second key frame, wherein the second position is different from the first position;
identify a first plurality of points of interest from the first key frame, wherein the first plurality of points of interest identify features from the scene;
identify a second plurality of points of interest from the second key frame, wherein the second plurality of points of interest identify at least a portion of the features from the scene;
match a portion of the first plurality of points of interest and a portion of the second plurality of points of interest;
identify a plurality of key points associated with the object based at least in part on the match of the portion of the first plurality of points of interest and the portion of the second plurality of points of interest and deleting points of interest with a mean distance to a threshold number of nearest points of interest that is more than a threshold distance; and
store at least a portion of the plurality of key points associated with the object as an object representation in an object detection database.

18. The non-transitory computer-readable medium of claim 17 wherein the instructions, when executed by the processor, further cause the device to:
filter the first plurality of points of interest and the second plurality of points of interest to identify the plurality of points of interest associated with the object as part of identifying key points associated with the object.

19. The non-transitory computer-readable medium of claim 18 wherein the instructions, when executed by the processor, further cause the device to:
delete the points of interest that are not matched with points of interest from other key frames as part of the filtering the first plurality of points of interest and the second plurality of points of interest to identify points of interest associated with the object.

20. The non-transitory computer-readable medium of claim 18 wherein the instructions, when executed by the processor, further cause the device to:
delete a set of key points outside of a defined volume of the object as part of the filtering the first plurality of points of interest and the second plurality of points of interest to identify points of interest associated with the object; and
wherein each key point of the plurality of key points associated with the object as the object representation in the object detection database comprises coordinate information, brightness information, and surrounding pixel pattern information.

* * * * *